(12) United States Patent
Park

(10) Patent No.: US 9,432,147 B2
(45) Date of Patent: Aug. 30, 2016

(54) METHOD AND APPARATUS OF TRANSMITTING CONTROL INFORMATION CONSIDERING TDD-FDD CA

(71) Applicant: Innovative Technology Lab Co., Ltd., Seoul (KR)

(72) Inventor: Dong Hyun Park, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 184 days.

(21) Appl. No.: 14/525,960

(22) Filed: Oct. 28, 2014

(65) Prior Publication Data

US 2015/0117275 A1  Apr. 30, 2015

Related U.S. Application Data

(60) Provisional application No. 61/897,184, filed on Oct. 29, 2013.

(51) Int. Cl.
*H04W 4/00* (2009.01)
*H04J 1/00* (2006.01)
*H04L 1/18* (2006.01)
*H04L 5/00* (2006.01)
*H04W 72/12* (2009.01)

(52) U.S. Cl.
CPC .......... *H04L 1/1812* (2013.01); *H04L 1/1896* (2013.01); *H04L 5/00* (2013.01); *H04W 72/1289* (2013.01)

(58) Field of Classification Search
CPC . H04L 1/1893; H04L 1/1897; H04L 5/0091; H04L 5/001; H04L 1/1671; H04L 1/1854; H04L 5/14; H04L 1/1861; H04L 1/1812; H04L 5/0055; H04W 52/04; H04W 72/0446; H04W 72/0413; H04W 72/042; H04W 72/00; H04W 72/005; H04W 72/02; H04W 72/0426; H04W 72/00433; H04W 72/12; H04W 72/1278; H04W 36/0083; H04W 24/10; H04W 24/00; H04W 36/00; H04W 72/0406
USPC .................................................. 370/329–341
See application file for complete search history.

(56) References Cited

U.S. PATENT DOCUMENTS

| | | | |
|---|---|---|---|
| 2012/0257552 A1* | 10/2012 | Chen ....................... | H04L 5/001 370/280 |
| 2013/0136006 A1 | 5/2013 | Kim et al. | |
| 2015/0124664 A1* | 5/2015 | Park ....................... | H04L 1/1812 370/280 |
| 2015/0124665 A1* | 5/2015 | Park ....................... | H04B 7/0634 370/280 |
| 2015/0124724 A1* | 5/2015 | Yang ...................... | H04L 5/0028 370/329 |
| 2015/0146588 A1* | 5/2015 | Park ....................... | H04L 5/0055 370/280 |
| 2015/0195062 A1* | 7/2015 | Hwang .................. | H04L 1/1607 370/329 |
| 2015/0215079 A1* | 7/2015 | Park ....................... | H04L 5/0055 370/280 |
| 2015/0271758 A1* | 9/2015 | Park ....................... | H04W 52/146 370/280 |

OTHER PUBLICATIONS

"Details of TDD-FDD CA", 3GPP TSG RAN WG1 #74bis, Oct. 7-11, 2013, pp. 1-7, R1-134056, Huawei, HiSilicon, Guangzhou, China.

(Continued)

*Primary Examiner* — Hanh N Nguyen

(57) ABSTRACT

The present disclosure relates to an apparatus and method for configuring a DCI format for a TDD-FDD CA environment and an FDD-TDD CA environment. According to aspects, an HARQ process number field, a DAI filed in a downlink DCI format, and a DAI field in an uplink DCI format are differently configured for the TDD-FDD CA environment and the FDD-TDD CA environment.

18 Claims, 11 Drawing Sheets

(56) References Cited

OTHER PUBLICATIONS

"Specification support for FDD-TDD CA", 3GPP TSG RAN WG1 #74bis, Oct. 7-11, 2013, pp. 1-4, R1-134168, Samsung, Guangzhou, China.

"HARQ timing for TDD-FDD carrier aggregation", 3GPP TSG RAN WG1 #74bis, Oct. 7-11, 2013, pp. 1-7, R1-134396, LG Electronics, Guangzhou, China.

"Discussion on HARQ issues for TDD-FDD CA", 3GPP TSG RAN WG1 #74bis, Oct. 7-11, 2013, pp. 1-5, R1-134437, MediaTek Inc., Guangzhou, China.

International Search Report for International Patent Application No. PCT/KR2014/010166, dated Jan. 16, 2015.

Written Opinion for International Patent Application No. PCT/KR2014/010166, dated Jan. 16, 2015.

"3rd Generation Partnership Project; Technical Specification Group Radio Access Network; Evolved Universal Terrestrial Radio Access (E-UTRA); Physical layer procedures (Release 11)," 3GPP TS 36.213 V11.4.0, Sep. 2013, pp. 1-182, 3GPP Organization Partners.

"3rd Generation Partnership Project; Technical Specification Group Radio Access Network; Evolved Universal Terrestrial Radio Access (E-UTRA); Multiplexing and channel coding (Release 11)," 3GPP TS 36.212 V11.3.0, Jun. 2013, pp. 1-84, 3GPP Organizational Partners.

"PDSCH timing with TDD as PCell for FDD-TDD CA", 3GPP TSG RAN WG1 Meeting #74bis Guangzhou, China, CATT, Oct. 7-11, 2013, pp. 1-4.

"UCI transmission for FDD-TDD carrier aggregation", 3GPP TSG RAN WG1 Meeting #74bis Guangzhou, China, CATT, Oct. 7-11, 2013, pp. 1-3.

"HARQ operation for TDD plus FDD CA", 3GPP TSG RAN WG1 #74bis Guangzhou, China, Samsung, Oct. 7-11, 2013, pp. 1-3.

"Specification support for FDD-TDD CA", 3GPP TSG RAN WG1 #74bis Guangzhou, China, Samsung, Oct. 7-11, 2013, pp. 1-3.

"Discussion on HARQ issues for TDD-FDD CA", 3GPP TSG-RAN WG1 Meeting #74bis Guangzhou, China, MediaTek Inc., Oct. 7-11, 2013, pp. 1-4.

* cited by examiner

FIG. 3

| Pcell(TDD#0) | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| index of G/H | D | S | U | U | U | D | S | U | U | U | D | S | U | U | U | D | S | U | U | U |
| 1 | G/H(4) | | | | | | | | | | | | | | | | | | | |
| 2 | G/H(5) | | | | | | | | | | | | | | | | | | | |
| 3 | G/H(6) | | | | | | | | | | | | | | | | | | | |
| 4 | G/H(6) | | | | | | | | | | | | | | | | | | | |
| 5 | G/H(7) | | | | | | | | | | | | | | | | | | | |
| 6 | | | | | G/H(4) | | | | | | | | | | | | | | | |
| 7 | | | | | G/H(5) | | | | | | | | | | | | | | | |
| 8 | | | | | G/H(6) | | | | | | | | | | | | | | | |
| 9 | | | | | | | G/H(6) | | | | | | | | | | | | | |
| 10 | | | | | | | G/H(7) | | | | | | | | | | | | | |

| Scell(FDD) | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| index of G/H | D | U | D | D | U | D | D | D | D | D | D | U | D | D | U | D | D | D | D | D |
| 1 | | | | | P(6) | | | | | | | | | | | | | | | |
| 2 | | | | | | P(5) | | | | | | | | | | | | | | |
| 3 | | | | | | | P(4) | | | | | | | | | | | | | |
| 4 | | | | | | | | P(4) | | | | | | | | | | | | |
| 5 | | | | | | | | | P(13) | | | | | | | | | | | |
| 6 | | | | | | | | | | P(6) | | | | | | | | | | |
| 7 | | | | | | | | | | | | | | | | P(5) | | | | |
| 8 | | | | | | | | | | | | | | | | | P(4) | | | |
| 9 | | | | | | | | | | | | | | | | | | | P(4) | |
| 10 | | | | | | | | | | | | | | | | | | | | P(13) |

FIG. 4

| Pcell(TDD#1) | index of G/H | 0 D | 1 S | 2 U | 3 U | 4 D | 5 D | 6 S | 7 U | 8 U | 9 D |
|---|---|---|---|---|---|---|---|---|---|---|---|
| | 1 | G/H(4) | | | | | | | | | |
| | 2 | G/H(5) | | | | | | | | | |
| | 3 | | G/H(5) | | | | | | | | |
| | 4 | | G/H(6) | | | | | | | | |
| | 5 | | | | | G/H(4) | | | | | |
| | 6 | | | | | | G/H(4) | | | | |
| | 7 | | | | | | G/H(5) | | | | |
| | 8 | | | | | | | G/H(5) | | | |
| | 9 | | | | | | | G/H(6) | | | |
| | 10 | | | | | | | | | G/H(4) | |

| Scell (FDD) | index of G/H | 0 D/U | 1 D/U | 2 D/U | 3 D/U | 4 D/U | 5 D/U | 6 D/U | 7 D/U | 8 D/U | 9 D/U |
|---|---|---|---|---|---|---|---|---|---|---|---|
| | 1 | | | | | P(6) | | | | | |
| | 2 | | | | | | P(5) | | | | |
| | 3 | | | | | | | P(5) | | | |
| | 4 | | | | | | | | P(4) | | |
| | 5 | | | | | | | | | P(6) | |
| | 6 | | | | | | | | | P(6) | |
| | 7 | | | | | | | | | | P(5) |
| | 8 | | | | | | | | | | P(5) |
| | 9 | | | P(4) | | | | | | | |
| | 10 | | | | P(6) | | | | | | |

FIG. 6

| Pcell(TDD#5) | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | D | D | S | U | D | D | D | D | D | D | D | D | S | U | D | D | D | D | D | D | D |
| | | | | | | | | | | | | | | A/N | | | | | | | |

| Scell (FDD) | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | D | D | D | D | D | D | D | D | D | D | D | D | D | D | D | D | D | D | D | D | D |
| | U | U | U | U | U | U | U | U | U | U | U | U | U | U | U | U | U | U | U | U | U |
| Process#0 | G/P | | | | | | | | | | | | | | | | | | | | |
| Process#1 | | G/P | | | | | | | | | | | | | | | | | | | |
| Process#2 | | | G/P | | | | | | | | | | | | | | | | | | |
| Process#3 | | | | G/P | | | | | | | | | | | | | | | | | |
| Process#4 | | | | | G/P | | | | | | | | | | | | | | | | |
| Process#5 | | | | | | G/P | | | | | | | | | | | | | | | |
| Process#6 | | | | | | | G/P | | | | | | | | | | | | | | |
| Process#7 | | | | | | | | G/P | | | | | | | | | | Ret | | | |
| Process#8 | | | | | | | | | G/P | | | | | | | | | | | | |
| Process#9 | | | | | | | | | | G/P | | | | | | | | | | | |
| Process#10 | | | | | | | | | | | G/P | | | | | | | | | | |
| Process#11 | | | | | | | | | | | | G/P | | | | | | | | | |
| Process#12 | | | | | | | | | | | | | G/P | | | | | | | | |
| Process#13 | | | | | | | | | | | | | | G/P | | | | | | | |
| Process#14 | | | | | | | | | | | | | | | G/P | | | | | | |
| Process#15 | | | | | | | | | | | | | | | | G/P | | | | | |
| Process#16 | | | | | | | | | | | | | | | | | G/P | | | | |

FIG. 7

| | 0 | 1 | 2 | 3 | 4 | 5 | 6 | 7 | 8 | 9 |
|---|---|---|---|---|---|---|---|---|---|---|
| Pcell(TDD#1) | D | S | U | U | D | D | S | U | U | D |
| | | | 7,6 | 4 | | | | 7,6 | 4 | |
| Scell(FDD) | D | D | D | D | D | D | D | D | D | D |
| | U | U | U | U | U | U | U | U | U | U |
| Ref#2 | | | 8,7,4,6 | | | | | 8,7,4,6 | | |

FIG. 8

| Pcell (FDD) | index of G/H | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|
| | | D | U | D | D | D | D | D | D | D | D | D | U | D | D | D | D | D | D | D | D | D | U | D | D | D | D | D | D | D | D |
| | 1 | G/H(4) | | | | | | | | | | | | | | | | | | | | | | | | | | | | |
| | 2 | | | G/H(4) | | | | | | | | | | | | | | | | | | | | | | | | | | |
| | 3 | | | | | G/H(4) | | | | | | | | | | | | | | | | | | | | | | | | |
| | 4 | | | | | | | G/H(4) | | | | | | | | | | | | | | | | | | | | | | |
| | 5 | | | | | | | | | G/H(4) | | | | | | | | | | | | | | | | | | | | |
| | 6 | | | | | | | | | | | G/H(4) | | | | | | | | | | | | | | | | | | |

| Scell (TDD#0) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | S | U | U | U | D | S | U | U | U | D | S | U | U | U | D | S | U | U | U |
| | 1 | | | | | P(6) | | | | | | | | | | | | | | | |
| | 2 | | | | | | | | P(6) | | | | | | | | | | | | |
| | 3 | | | | | | | | | | P(6) | | | | | | | | | | |
| | 4 | | | | | | | | | | | | | P(6) | | | | | | | |
| | 5 | | | | | | | | | | | | | | | | | | P(6) | | |
| | 6 | | | | | | | | | | | | | | | | | | | | P(6) |

FIG. 9

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Pcell (FDD) | D | D | D | D | D | D | D | D | D | D | D | D | D | D | D | D | D | D | D | D |
| | U | U | U | U | U | U | U | U | U | U | U | U | U | U | U | U | U | U | U | U |
| | | | | 4 | A/N | A/N | 4 | 4 | A/N | A/N | A/N | | | | | | | | | |
| Scell (TDD#1) | D | S | U | U | D | D | S | U | U | D | D | S | U | U | D | D | S | U | U | D |
| | G/P | G/P | | | G/P | G/P | G/P | | | G/P | G/P | | | | | | | | | |

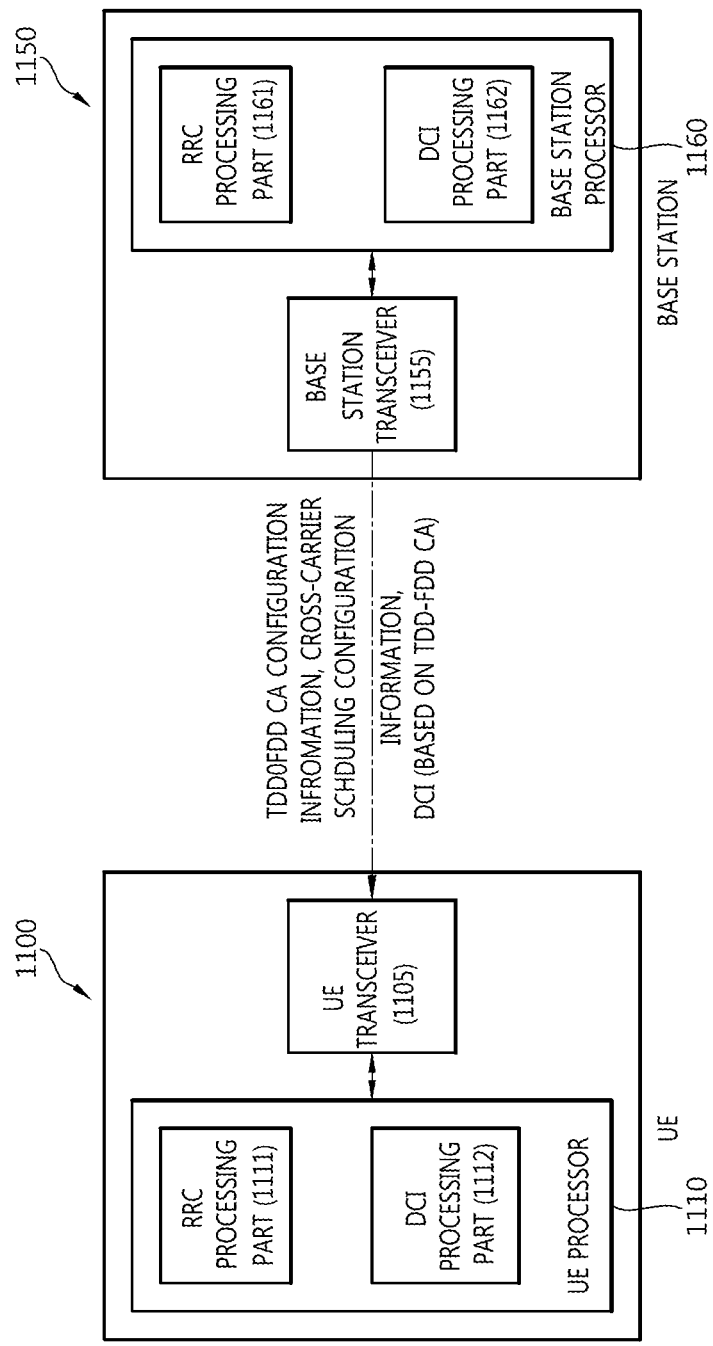

METHOD AND APPARATUS OF TRANSMITTING CONTROL INFORMATION CONSIDERING TDD-FDD CA

CROSS-REFERENCE TO RELATED APPLICATION

This application claims priority from and the benefit of U.S. provisional patent application Ser. No. 61/897,184, filed on Oct. 29, 2013, which is hereby incorporated by reference in its entirety.

BACKGROUND

1. Field

The present disclosure relates to a wireless communication and, more particularly, to a method and apparatus of transmitting control information considering TDD (Time Division Duplex)-FDD (Frequency Division Duplex) CA (Carrier Aggregation).

2. Discussion of the Background

A wireless communication system may support Frequency Division Duplex (FDD) scheme and Time Division Duplex (TDD) scheme. In the FDD scheme, an uplink transmission and a downlink transmission may be simultaneously performed in a cell because a carrier frequency for an uplink (UL) transmission is different from a carrier frequency for a downlink (DL) transmission exists. In the TDD scheme, with respect to one cell, an uplink transmission and a downlink transmission are distinguished from each other based on different time slots. In the TDD scheme, a base station and a user equipment perform switching operations between a transmission mode and a reception mode because the same carrier is used for both an uplink transmission and a downlink transmission. In the TDD scheme, a Special Subframe may be added to provide a guard time for switching between the transmission mode and the reception mode. The Special Subframe may include Downlink Pilot Time Slot (DwPTS), Guard Period (GP), and Uplink Pilot Time Slot (UpPTS). According to the TDD scheme, resource amounts for the uplink transmission and resource amounts for the downlink transmission may be asymmetrically assigned through various uplink (UL)-downlink (DL) configurations.

Currently, remaining frequency resources are scarce and various technologies have been utilized in wide frequency bands because of the frequency resource scarcity. For this reason, in order to provide a wideband bandwidth for supporting higher data-rate requirements, each of scattered bands has been configured to satisfy basic requirements to operate an independent system and a carrier aggregation (CA) scheme, which aggregates various frequency bands into one system, has been adopted. Here, each frequency band or carrier capable of an independent operation may be defined as a component carrier (CC). Recently being considered is TDD-FDD CA method that supports CA of TDD carrier and FDD carrier. In effectively supporting FDD-FDD CA, methods different from the existing ones may be considered in the execution of scheduling, HARQ (Hybrid Automatic Repeat Request)-ACK (Acknowledgement), and UL power control. Also required of a base station is to transmit DL control information to UE considering GDD-FDD CA.

SUMMARY

Exemplary embodiments of the present disclosure provide a method and apparatus for transmitting control information considering TDD-FDD CA.

Exemplary embodiments of the present disclosure provide DCI (Downlink Control Information) format considering TDD-FDD CA.

Exemplary embodiments of the present disclosure provide UL DCI format considering TDD-FDD CA.

Exemplary embodiments of the present disclosure provide DL DCI format considering TDD-FDD CA.

An exemplary embodiment of the present invention provides a method of transmitting control information for a wireless communication system that supports TDD (Time Division Duplex)-FDD (Frequency Division Duplex) CA (Carrier Aggregation). This method includes the process of configuring DCI (Downlink Control Information) for TDD-FDD CA-configured user equipment (UE) and the process of transmitting the configured DCI to the UE through either PDCCH (Physical Downlink Control Channel) or EPDCCH (Enhanced PDCCH), and the configuration of this DCI is characterized to consider each duplex mode of primary serving cell and secondary serving cell.

An exemplary embodiment of the present invention provides a method of receiving control information for a wireless communication system that supports TDD (Time Division Duplex)-FDD (Frequency Division Duplex) CA (Carrier Aggregation). This method includes the process of receiving DCI by decoding either PDCCH (Physical Downlink Control Channel) or EPDCCH (Enhanced PDCCH) transmitted from a base station, and the process of performing the control function directed by the DCI. Configuration of the DCI considers each duplex mode of primary serving cell and secondary serving cell regarding the TDD-FDD CA-configured UE.

An exemplary embodiment of the present invention provides a base station that transmit control information in the wireless communication system supporting TDD (Time Division Duplex)-FDD (Frequency Division Duplex) CA (Carrier Aggregation). This base station includes DCI processing part, e.g., a processor, which configures DCI (Downlink Control Information) for the TDD-FDD CA-configured UE and a transceiver which transmits the configured DCI to the UE through PDCCH (Physical Downlink Control Channel) or EPDCCH (Enhanced PDCCH). This DCI processing part considers each duplex mode of primary serving cell and secondary serving cell in configuring the DCI.

According to aspects, DCI format considering TDD-FDD CA can be provided and the TDD-FDD CA function can be effectively supported.

BRIEF DESCRIPTION OF THE DRAWINGS

FIG. 3 is a diagram illustrating an example of a new UL HARQ/scheduling timing for a case configured with TDD-FDD CA and cross-carrier scheduling.

FIG. 4 is a diagram illustrating another example of a new UL HARQ/scheduling timing for a case configured with TDD-FDD CA and cross-carrier scheduling.

FIG. 6 is a diagram illustrating an example of DL HARQ process in a case TDD-FDD CA is configured.

FIG. 7 is a diagram illustrating an example of cross-carrier scheduling in a case TDD-FDD CA is configured.

FIG. 8 is a diagram illustrating another example of UL HARQ/scheduling timing in a case TDD-FDD CA and cross-carrier scheduling are configured.

FIG. 9 is a diagram illustrating another example of DL HARQ timing in a case TDD-FDD CA is configured.

FIG. 11 is a bloc diagram illustrating the UE and base stations according to an exemplary embodiment of the present invention.

DETAILED DESCRIPTION OF THE ILLUSTRATED EMBODIMENTS

Figure 1:
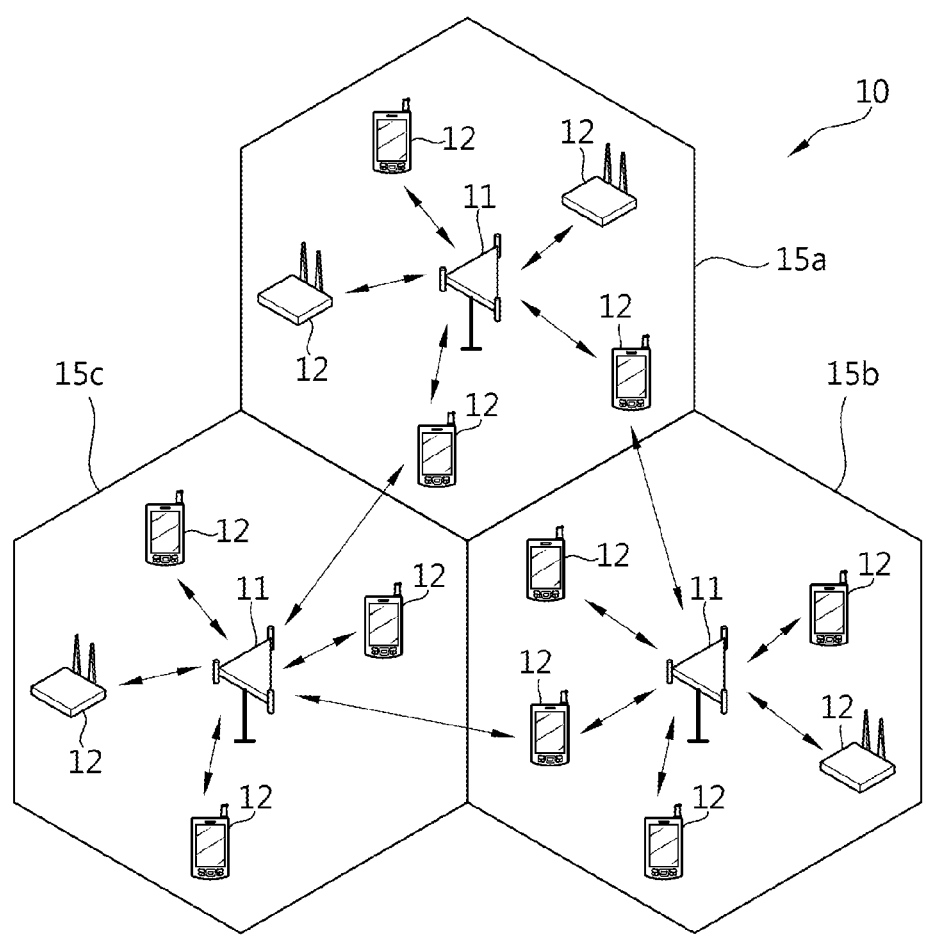
FIG. 1 is a diagram illustrating a wireless communication system according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present.

Further, the description herein is related to a wireless communication network, and an operation performed in a wireless communication network may be performed in a process of controlling a network and transmitting data by a system that controls a wireless network (e.g., a base station) or may be performed in a user equipment connected to the wireless communication network.

FIG. 1 is a diagram illustrating a wireless communication system according to an exemplary embodiment of the present invention.

According to FIG. 1, a wireless communication system 10 is widely deployed in order to provide diverse telecommunication services, such as voice and packet data. A wireless communication system includes at least one base station 11 (evolved-NodeB, eNB). Each base station 11 provides telecommunication service to certain cells 15a, 15b, and 15c. A cell may again be divided into multiple sectors.

User equipment 12 (UE) may be located at a certain location or mobile, and may also be referred to as different terms, including MS (mobile station), MT (mobile terminal), UT (user terminal), SS (subscriber station), wireless device, PDA (personal digital assistant), wireless modem, and handheld device. An eNB 11 may also be referred to as BS (base station), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term DL refers to communication from base station 11 to UE 12, and the term UL refers to communication from UE 12 to base station 11. For DL, a transmitter may be part of base station 11, and a receiver may be part of UE 12. For UL, a transmitter may be part of UE 12 and a receiver may be part of base station 11. There is no limitation to the multiple access methods applied to a wireless communication system. Diverse methods may be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. UL transmission and DL transmission may use either TDD (Time Division Duplex), which uses different time locations for transmissions, or FDD (Frequency Division Duplex), which uses different frequencies for transmissions.

Carrier aggregation (CA) supports multiple carriers and is also referred to as spectrum aggregation or bandwidth aggregation. Each individual unit carrier that is being aggregated is called component carrier (CC). Each CC is defined by the bandwidth and center frequency. CA is introduced in order to support increasing throughput, to prevent cost increase due to the introduction of wideband RF (radio frequency) element, and to secure the compatibility with the existing system. For example, when five CCs each having 20 MHz bandwidth are assigned as the granularity, they can support up to 100 MHz.

CA is divided into contiguous carrier aggregation that involves contiguous CCs in the bandwidth and non-contiguous carrier aggregation that involves non-contiguous CCs. The number of CCs aggregated for downlink and uplink may be set differently. When both UP and DL have same number of aggregated CCs, it is called symmetric aggregation. When the numbers vary, it is called asymmetric aggregation.

The size of each CC (in other word, the bandwidth) may be different from each other. For instance, when 5 CCs are used to compose a 70 MHz bandwidth, they may be 5 MHz CC (carrier #0)+20 MHz CC (carrier #1)+20 MHz CC (carrier #2)+20 MHz CC (carrier #3)+5 MHz CC (carrier #4).

Hereinafter, multiple carrier system includes the system that supports carrier aggregation (CA). For a multiple carrier system, contiguous CA and/or non-contiguous CA and either symmetric or asymmetric aggregation could be used. A serving cell may be defined as a CC bandwidth that may be aggregated by CA based on multiple component carrier system. Serving cells are divided into primary serving cell (PCell) and secondary serving cell (SCell). A PCell means a serving cell which provides security input and NAS(Non-Access Stratum) mobility information in the RRC(Radio Resource Control) establishment or re-establishment state. Depending on the capabilities of the UE, at least one cell may be configured to consist the serving cell group with a primary serving cell, and this cell is called secondary serving cell. The serving cell group configured in a UE may be consisted of one primary serving cell only, or one primary serving cell and at least one secondary serving cell.

The DL CC corresponding to the primary serving cell refers to DL primary component carrier (DL PCC) and the UP CC corresponding to the primary serving cell refers to UL primary component carrier (UL PCC). Also, in DL, the CC corresponding to the secondary serving cell refers to DL secondary component carrier (DL SCC), and in UL, the CC corresponding to the secondary serving cell refers to UL secondary component carrier (UL SCC). One serving cell may correspond with DL CC only, or DL CC and UL CC together. The composition of serving cell may be directed by SIB2 (System Information Block 2) signaling (or dedicated RRC signaling).

Radio frame, one of the physical layers of a wireless communication system, includes 10 subframes, and one subframe includes 2 consecutive slots. A physical layer may function by TDD (Time Division Duplex) and/or FDD (Frequency Division Duplex).

In case of FDD, the carrier used for the UL transmission and the carrier used for the DL transmission are present separately, and the UL transmission and DL transmission may be done simultaneously in one cell.

In case of TDD, the UL transmission and DL transmission are always separate by time. Same carrier is used for both UL and DL transmission, and thus the base station and the UE continues conversion between the transmission mode and reception mode. In case of TDD, special subframe may be placed to provide guard time for the mode conversion between transmission and reception. Special subframe, as seen in the diagram, may include downlink parts (DwPTS), guard time (GP), and uplink parts (UpPTS). DwPTS is used for the initial cell search, synchronization, or channel estimation of the UE. UpPTS is used for the channel estimation at the base station and the synchronization of UL transmission at the UE. The guard time is needed to avoid the interference between the UL and DL, and during the guard time neither UL nor DL transmission takes place.

TABLE 1 illustrates an example of UL/DL configuration of a wireless frame. The UL/DL configuration defines the subframe reserved for UL transmission and the subframe reserved for DL transmission. In other words, the UP/DL configuration indicates the pattern the UL and DL are assigned (or reserved) for every subframe within a wireless frame.

TABLE 1

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 m  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In TABLE 1, D is downlink subframe, U is uplink subframe, and S is special subframe. As TABLE 1 shows, subframe 0 and 5 are always assigned to DL transmission, and subframe 2 is always assigned to UL transmission. As shown in TABLE 1, each UL/DL configuration differs from each other in terms of the position and number of the DL subframe and UL subframe within one wireless frame. Diverse UL/DL configuration may asymmetrically assign the resources allocated to UL transmission and DL transmission. In order to avoid strong interference between UL and DL among cells, neighboring cells generally have same UL/DL configuration.

The moment of conversion from DL to UL or UL to DL is called switching point. Switch-point periodicity means the cycle of conversion pattern between UL subframe and DL subframe, which is 5 ms or 10 ms.

The UL/DL configuration of the TABLE 1 may be transmitted from a base station to a UE via system information. Whenever the UL/DL configuration changes, the base station may inform UE of the changing allocation of UL-DL of the wireless frame by transmitting only the UL/DL configuration index. Or the UL/DL configuration may be the control information transmitted commonly to all the UEs within the cell through broadcast channel as broadcasting information.

There are several physical channels used in the physical layers. PDCCH (Physical Downlink Control Channel), as a DL physical channel, carries scheduling assignment. PDCCH may inform UE of the resource allocation of PCH (Paging Channel) and DL-SCH (Downlink Shared Channel) and DL-SCH related HARQ (Hybrid Automatic Repeat Request) information. PDCCH may carry the UL grant which informs UE of the resource allocation for UL transmission. Meanwhile, aside from PDCCH, for the purpose of expanding the capacity of PDCCH, enhanced PDCCH (EPDCCH) may be used. Hereinafter, PDCCH may include EPDCCH. PDSCH (Physical Downlink Shared Channel) is mapped with DL-SCH. PCFICH (Physical Control Format Indicator Channel) informs UE of the number of OFDM symbols used in PDCCH, and transmitted to each subframe. PHICH (Physical Hybrid ARQ Indicator Channel) is a DL channel, and carries HARQ ACK/NACK signal responding to UL transmission. PUCCH (Physical Upnlink Control Channel), as an uplink physical channel, carries uplink control information such as HARQ (Hybrid Automatic Repeat reQuest) ACK (Acknowledgement)/NACK (Non-acknowledgement), and channel status information (CSI) that indicates downlink channel condition, e.g., CQI (Channel Quality Indicator), PMI (precoding matrix index), PTI (precoding type indicator), RI (rank indication). PUSCH (Physical Uplink Shared Channel) carries UL-SCH (Uplink Shared Channel). PRACH (Physical Random Access Channel) carries random access preamble.

Multiple PDCCH may be transmitted on one subframe, and UE may monitor multiple PDCCH. PDCCH is transmitted on one CCE (control channel element) or aggregation of several consecutive CCEs. CCE is logical allocation unit used to provide PDCCH with encoding rate according to the wireless channel condition. CCE corresponds to multiple resource element groups. The number of CCE and the correlation with the encoding rate offered by CCE determines the format of PDCCH and the number of PDCCH bits.

The control information transmitted through PDCCH (EPDCCH) is called downlink control information (DCI). TABLE 2 below indicates DCI according to varying formats.

TABLE 2

| DCI format | Description |
|---|---|
| 0 | Used for scheduling PUSCH(uplink shared channel) in uplink cell |
| 1 | Used for scheduling one PDSCH codeword in one cell |
| 1A | Used for compact scheduling of one PDSCH codeword and in random access procedure initialized by the PDCCH order in one cell |
| 1B | Used for compact scheduling of one PDSCH codeword in one cell, using precoding information |
| 1C | Used for compact scheduling of one PDSCH codeword and informing of MCCH change |
| 1D | Used for compact scheduling of one PDSCH codeword in one cell which includes precoding and power offset information |
| 2 | Used for PDSCH scheduling of a UE configured for spatial multiplexing mode |
| 2A | Used for PDSCH scheduling of a UE configured for large delay CDD mode |
| 2B | Used for transmission mode 8(including dual layer transmission) |
| 2C | Used for transmission mode 9(including multiple layer transmission) |
| 2D | Used for transmission mode 10(CoMP) |

TABLE 2-continued

| DCI format | Description |
|---|---|
| 3 | Used for transmission of TPC order for PUCCH and PUSCH, including 2-bit power adjustment |
| 3A | Used for transmission of TPC order for PUCCH and PUSCH, including one bit power adjustment |
| 4 | Used for PUSCH scheduling in a multiple antenna port transmission mode cell for UL |

As shown in TABLE 2, DCI formats include format 0 for PUSCH scheduling in UL cell, format 1 for the scheduling of one PDSCH codeword, format 1A for compact scheduling of one PDSCH codeword, format 1C for very compact scheduling of DL-SCH, format 2 for PDSCH scheduling at the closed-loop spatial multiplexing mode, format 2A for PDSCH scheduling at open-loop spatial multiplexing mode, format 2B used for TM (Transmission Mode)8, format 2C used for TM9, format 2D used for TM10, format 3 and format 3A for transmission of TPC (Transmission Power Control) order for UL channel, and format 4 for PUSCH scheduling in a multiple antenna ports transmission mode for UL. The types of DCI formats for TDD-FDD CA or FDD-TDD CA may be configured by incorporating basic types and structures of DCI formats for a TDD cell or an FDD cell specified in 3GPP TS 36.213 v.11.4.0 (2013-September), "Evolved Universal Terrestrial Radio Access (E-UTRA); Physical layer procedures", the relevant portions of which are hereby incorporated by reference.

Each field of DCI gets consecutively mapped onto n number of information bit, $a_0$ or $a_{n-1}$ For instance, when DCI gets mapped on total 44 bit-length of information bits, each DCI field is consecutively mapped onto $a_0$ or $a_{43}$. DCI formats 0, 1A, 3, 3A may all have same payload. DCI formats 0 and 4 may be called UL grant, and also be called UL DCI format.

DCI may include various related information according to each format and serving cell configuration. For example, UL DCI format (DCI format 0 and 4) may include 2-bit UL index field for TDD operation of TDD UL/DL configuration 0, and may include 2-bit downlink assignment index (DAI) for the TDD operation of TDD UL/DL configuration 1 or 6. In other words, UL index field is present in the UL DCI format only when it is needed for the TDD operation of TDD UL/DL configuration 0, and the DAI field is present in the UL DCI format only when it is needed for TDD operation of TDD UL/DL configuration 1 or 6. In such case, the UL index may be used for scheduling/HARQ-ACK timing and UL transmission power control of the UE. DAI basically informs UE to combine HARQ-ACK for how many transmissions. In other words, DAI indicates how many DL transmissions should one HARQ-ACK respond to. That is, DAI indicates how many HARQ-ACK bits are assigned on PUSCH commanded by UL DCI format. For example, the 2-bit DAI included in the UL DCI format may refer to the 2-bit DAI defined in e.g., section 7.3 of 3GPP TS 36.213 v.11.4.0 (2013-09), "Evolved Universal Terrestrial Radio Access (E-UTRA); Physical layer procedures", the relevant portions of which are hereby incorporated by reference.

For another example, DCI format 1A may include HARQ process number field, and this field may be configured as 3 bits for FDD and 4 bits for TDD. Also, DCI format 1A may include 2-bit DAI field for every TDD UL/DL configuration in TDD. In other words, DAI field is not present in case of FDD. Meanwhile, in case the CRC (cyclic redundancy check) parity bits of DCI format 1A are scrambled with RA (Random Access)-RNTI (Radio Network Temporary Identifier), P (Paging)-RNTI, or SI (System Information)-RNTI, above HARQ process number field and DAI field are reserved. For example, the 2-bit DAI field included in the DL DCI format, e.g., the DCI format 1A, may refer to the 2-bit DAI defined in 3GPP TS 36.213 v.11.4.0 (2013-September), "Evolved Universal Terrestrial Radio Access (E-UTRA); Physical layer procedures", the relevant portions of which are hereby incorporated by reference.

A UE may acquire DCI through monitoring PDCCH (or EPDCCH). When it is said that a UE monitors PDCCH, it includes monitoring of DCI. The process of monitoring PDCCH may include the procedure of demapping the resource element for PDCCH into modulation symbol based on the given PDCCH's assigning rule, the procedure of demodulation, which is extracting encoded data from the modulation symbol, the procedure of decoding, which is decoding the encoded data to extract DCI, the procedure of demasking CRC added to DCI, and the procedure of detecting errors. A UE may analyze the acquired DCI and execute the control operation commanded by the DCI.

Meanwhile, lately being considered in order to improve the flexibility and efficiency of the wireless communication is to support TDD-FDD CA for the wireless communication system.

Figure 2:
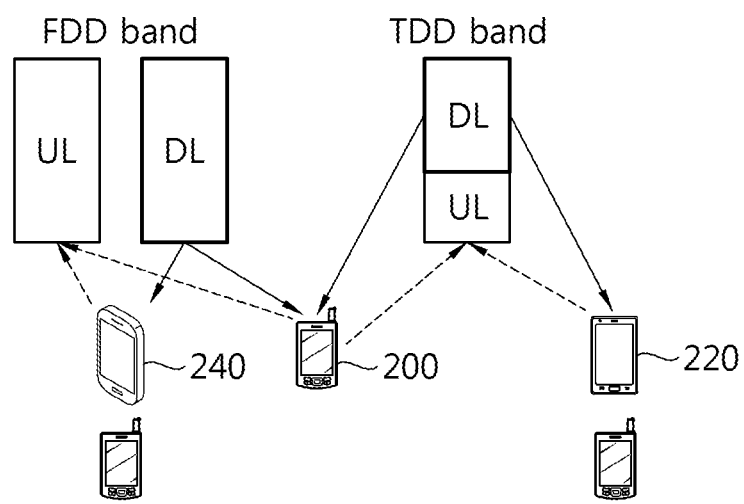
FIG. 2 is a diagram illustrating an example of FDD-TDD CA-configured UE in a wireless telecommunication system.

FIG. 2 is a diagram illustrating an example of a UE configured with TDD-FDD CA in a network.

As shown in FIG. 2, the legacy TDD UE 220 receives wireless communication service only through TDD carrier, and legacy FDD UE 240 receives wireless communication service only through FDD carrier. In contrast, TDD-FDD CA capable UE 200 may receive wireless communication service through both TDD carrier and FDD carrier, and may receive CA-base wireless communication service through TDD carrier and FDD carrier at the same time.

For example, a TDD-FDD CA capable UE may support simultaneous reception on TDD carrier and FDD carrier. For another example, a TDD-FDD CA capable UE may support simultaneous transmission on TDD carrier and FDD carrier. For another example, a TDD-FDD CA capable UE may support simultaneous transmission and reception on TDD carrier and FDD carrier.

In case of above TDD-FDD CA, the maximum number of aggregated CC to be supported may be 5, for example. Also may be supported is the aggregation of different UL/DL configurations for TDD carriers of different bands.

A TDD-FDD CA capable UE may support TDD-FDD DL CA, and may not support TDD-FDD UL CA. In other words, a TDD-FDD CA may at least support TDD-FDD DL CA and may or may not support TDD-FDD UL CA.

In present disclosure, the description is based on a UE configuring TDD-FDD CA through one base station, but the technical idea of present invention is not limited to such condition, and it may also apply to dual connectivity, that is, a carrier is configured through base station 1 and another carrier is configured through base station 2.

Also, TDD UL/DL configuration of TDD carrier includes reference UL/DL configuration. In other words, in present disclosure, TDD UL/DL configuration may be replaced with reference UL/DL configuration. For instance, when eIMTA (enhanced Interference Management and Traffic Adaptation) is configured, the time domain supports the dynamic change of TDD UL/DL configuration according to the traffic or interference environment, and in such case reference UL/DL configuration may be applied. Or in case the PCell is TDD or FDD carrier and the SCell is TDD carrier, reference UL/DL configuration may be applied for the SCell.

Hereinafter, exemplary embodiments of DCI format considering TDD-FDD CA will be described.

In order to efficiently support TDD-FDD CA, it may needs to change the related fields in DCI for scheduling, HARQ-ACK, and UL power control.

For one example, in case of UL DCI format (ex., DCI format 0/4), the definition and/or size of the UL index field and DAI field may be altered depending on which UL HARQ/scheduling timing (UL HARQ timing and/or UL scheduling timing) is applied. Or at least one of the UL index field and the DAI field may be eliminated.

For another example, in case of DL DCI format (ex., DCI format 1/1A/1B/2/2B/2C/2D), the definition and size of the HARQ process number field and DAI field may be altered depending on which DL HARQ timing is applied. Or at least one of the HARQ process number field and the DAI field may be eliminated.

For another example, in case of supporting cross-carrier scheduling, new DL index field may be added to DL DCI format. Cross-carrier scheduling is a scheduling method that uses PDCCH or EPDCCH transmitted by certain CC to allocate resource of PDSCH or PUSCH transmitted by other CC. In other words, PDCCH (EPDCCH) and PDSCH may be transmitted through different DL CC, and PUSCH may be transmitted through a UL CC different from another UL CC linked to DL CC in which PDCCH (EPDCCH) including UL grant is transmitted. Hereinafter, the serving cell performing cross-carrier scheduling may be called scheduling cell, and other serving cells being scheduled by a scheduling cell may be called scheduled cells. Thus, a system supporting cross-carrier scheduling needs a carrier indicator to inform the PDCCH (EPDCCH) commanding PDSCH/PUSCH transmission is being transmitted through which channel. Henceforward, the field that includes such carrier indicator is called carrier indication field (CIF). Henceforward, CIF configured may mean that the cross-carrier scheduling is configured.

TDD-FDD CA configuration may be divided into the case of TDD(PCell)-FDD(SCell) (Case 1) and the case of TDD (SCell)-FDD(PCell) (Case 2). Following are suggested DCI formats for each case.

Case 1. TDD(PCell)-FDD(SCell) CA (1) In case of UL DCI format (DCI format 0/4)

UL Index Field

In the existing DCI format, 2-bit UL index field was present only in case the serving cell (or carrier) was configured as TDD UL/DL 0. However, if the UE is configured with cross-carrier scheduling, new UL HARQ/scheduling timing may be applied.

FIG. 3 is a diagram illustrating an example of new UL HARQ/scheduling timing in case of TDD-FDD CA and cross-carrier scheduling configuration. FIG. 3 shows a case with PCell configured as TDD UL/DL 0 and SCell configured as FDD. The PCell is supposed to be a scheduling cell, and the SCell, a scheduled cell. Although in this example the scheduling serving cell is supposed as TDD PCell, the scheduling serving cell may be the PCell or any other TDD SCell or any other FDD SCell (in case 3 or more serving cells are aggregated by CA configuration). The above description may be applicable to other embodiments.

In FIG. 3, G is UL grant, H is PHICH, P is PUSCH, and the G/H (G and/or H) of the PCell is cross-carrier scheduling for the SCell. G/H(m) indicates that, after G/H is transmitted, PUSCH is transmitted in the mth subframe from the point in which the G/H is transmitted, and P(m) indicates that, after PUSCH is transmitted, UL grant/PHICH for the retransmission is transmitted in the mth subframe from the point in which the PUSCH is transmitted. This may be applicable to other embodiments.

FIG. 3, for the PCell, subframe 0 and 5 are configured as DL subframe, and subframe 1 and 6 are configured as special subframe. G/H for SCell may be transmitted from a base station to a UE through subframe 0, 1, 5, and 6 of the PCell. In this case the subframe 1 and 5 of the PCell may each order maximum 2 PUSCH transmission timing for SCell, and the subframe 0 and 5 of the PCell may each order maximum 3 PUSCH transmission timing for SCell.

This means the UL index field of the UL DCI format may be 3 bits. Therefore, exemplary embodiments provide the UL index field to have certain bits under the condition described below.

For one example (alt 2), in case TDD (any TDD UL/DL configuration)-FDD CA and cross-carrier scheduling are configured, the UL index field in the UL DCI format (by PDCCH/EPDCCH) on every DL subframe of the scheduling serving cell for the PUSCH transmission on FDD scheduled serving cell may be always configured as 2 bits.

For another example (alt 3), in case TDD-FDD CA and cross-carrier scheduling are configured, the UL index field in the UL DCI format (by PDCCH/EPDCCH) on every DL subframe of the scheduling serving cell for the PUSCH transmission on FDD scheduled serving cell is configured as 3 bits when the scheduling serving cell is configured as TDD UL/DL 0, and 2 bits when the scheduling serving cell is configured as TDD UL/DL 1 or 6.

For another example (alt 4), in case TDD-FDD CA and cross-carrier scheduling are configured, the UL index field in UL DCI format (by PDCCH/EPDCCH) of the scheduling serving cell for PUSCH transmission on the FDD scheduled serving cell is configured as 3 bits for certain DL subframe and configured as 2 bits for the rest of the DL subframe when the scheduling serving cell is configured as TDD UL/DL 0, and configured as 2 bits for every DL subframe when the scheduling serving cell is configured as TDD UL/DL 1 or 6.

For another example (alt 5), in case TDD-FDD CA and cross-carrier scheduling are configured, the UL index field in UL DCI format (by PDCCH/EPDCCH) of the scheduling serving cell for PUSCH transmission on the FDD scheduled serving cell is configured as 3 bits for every DL subframe in case the scheduling serving cell is configured as TDD UL/DL 0, and configured as 2 bits for certain DL subframe and 1 bit for the rest of the DL subframe in case the scheduling serving cell is configured as TDD UL/DL 1 or 6.

For another example (alt 6), in case TDD-FDD CA and cross-carrier scheduling are configured, the UL index field in UL DCI format (by PDCCH/EPDCCH) of the scheduling serving cell for PUSCH transmission on the FDD scheduled serving cell is configured as 3 bits for certain DL subframe, and 2 bits for the rest of the DL subframe when the scheduling serving cell is configured as TDD UL/DL 0, and 2 bits for certain DL subframe and 1 bit for the rest of the DL subframe in case the scheduling serving cell is configured as TDD UL/DL 1 or 6.

In a standard spec, the size of the UL index field in the UL DCI format transmitted on the certain subframe under certain condition for TDD-FDD CA may become 3 bits or 2 bits. For example, in above FIG. 3, the certain subframe may be subframe 0 and 5 (alt 4, 6) ordering three different PHSCH transmission timing. For another example, the certain subframe in the following FIG. 4, may be subframe 0, 1, 5, 6 (alt 5, 6) ordering two different PUSCH transmission timing.

FIG. 4 shows that for the PCell, subframe 0, 4, 5, 9 are configured as DL subframe, and subframe 1 and 6 are configured as special subframe. The G/H for the SCell may be transmitted from a base station to a UE through the subframe 0, 1, 4, 5, 6 and 9 of the PCell. In such case, the subframe 0, 1, 5, 6 of the PCell may each order maximum two PHSCH transmission timing for SCell, and the subframe 4 and 9 of the PCell may each order at least one PUSCH transmission timing for SCell.

DAI Field

In current standard, the DAI field in UL DCI format is present only for the TDD operation of TDD UL/DL configuration 1 or 6. However, when considering the DL HARQ timing to apply in a UE configured with TDD(PCell)-FDD (SCell) CA, it needs to send DAI field for FDD SCell in some cases.

Figure 5:
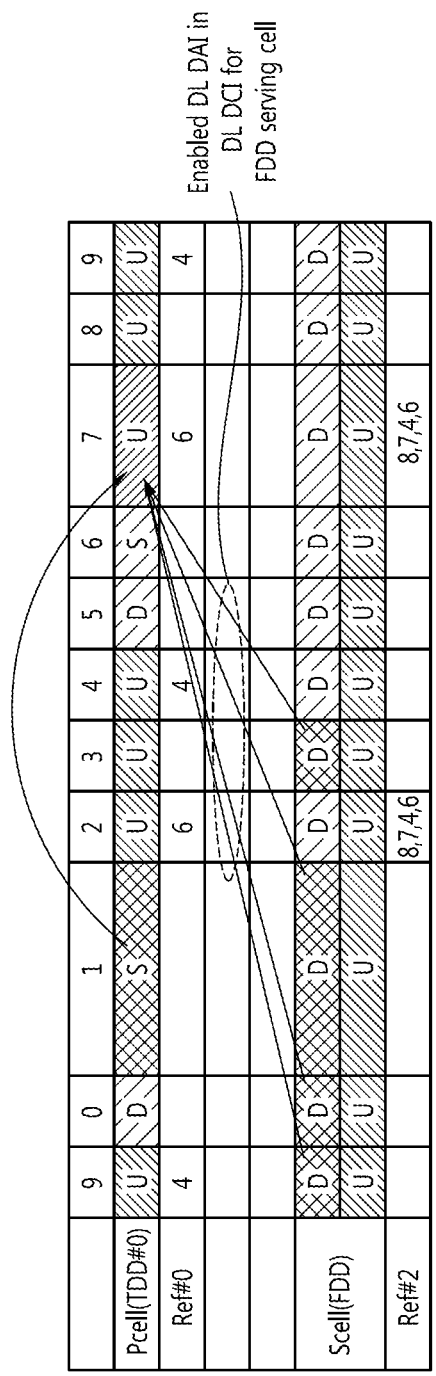
FIG. 5 is a diagram illustrating an example of DL HARQ timing in a case TDD-FDD CA is configured.

FIG. 5 is a diagram illustrating an example of DL HARQ timing in case of TDD-FDD CA configuration.

In FIG. 5, the number appears on PCell indicates DL HARQ timing for the PCell, and the number on SCell indicates DL HARQ timing for the SCell. In other words, in case there is PDSCH transmission indicated by the extraction of corresponding PDCCH/EPDCCH in subframe n−k, or in case there is PDCCH/EPDCCH commanding to release the DL SPS(Semi-Persistent Scheduling), the UE transmits the HARQ response in subframe n of the PCell, and the number on the subframe n (for example 2, 4, 7, or 9) of the PCell indicates the DL subframe set, namely K={$k_0$, $k_1$, . . . , $k_{M-1}$}, of the PCell, which is associated with the related subframe of the PCell. More specifically, n−k is an index of a subframe located before a subframe having an index n such that total k−1 number of subframes are located between the subframe having the index n-k and the subframe having the index n, and the n-k indicates the DL subframe associated with current subframe n. Also, the number on the subframe n of SCell indicates the DL subframe set associated with the relevant subframe of the PCell (HARQ response for the DL subframe of PCell may be transmitted from PCell). Associated DL subframe refers to the subframe that carries PDSCH, which is the basis of discerning the ACK/NACK signal, and M is the number of elements in set K, indicating the number of DL subframes associated with the subframe having index n.

As shown in FIG. 5, multiple number of DL subframes on the FDD SCell may be associated with one UL subframe (ex., subframe 7) on the TDD PCell. For example, when PUSCH transmitted on the FDD SCell is commanded by HL DCI format (by PDCCH/EPDCCH), DAI field needs to be added to the UL DCI format for the PUSCH in order to transmit HARQ-ACK bits. Therefore, exemplary embodiments provide DAI field being included in the UL DCI format under the following condition.

For an example (alt 1), when TDD (any TDD UL/DL configuration)-FDD CA is configured, the DAI field in the UL DCI format (by PDCCH/EPDCCH) on every DL subframe for PUSCH transmission on the FDD SCell (self scheduling or scheduled serving cell) may be always configured as 2 bits.

(2) In case of DL DCI format (ex., DCI format 1/1B/1D/2/2A/2B/2C/2D)

HARQ Process Number Field

According to current standard, DL DCI format may include HARQ process number field, and the field may be 3 bits in case of FDD and may be 4 bits in case of TDD. The size of HARQ process number field may be determined by the maximum number of DL HARQ process. Following table shows the maximum DL HARQ process numbers for TDD supported by current standard. For FDD, there are maximum 8 DL HARQ processes per serving cell.

TABLE 3

| TDD UL/DL configuration | Max. number of HARQ process |
|---|---|
| 0 | 4 |
| 1 | 7 |
| 2 | 10 |
| 3 | 9 |
| 4 | 12 |
| 5 | 15 |
| 6 | 6 |

Until now, for FDD, as there are maximum 8 DL HARQ processes, 3 bits for HARQ process number field was sufficient ($2^3$=8), and for TDD, 4 bits ($2^4$=16) was applied to the HARQ process number field as there are maximum 15 DL HARQ processes.

However, when TDD-FDD CA is configured, especially if the TDD UL/DL configuration 5 serving cell and FDD serving cell are CA-configured, and if the timing is supported for scheduling every DL subframe on the FDD serving cell, the maximum HARQ process number for FDD serving cell may increase beyond 16.

FIG. 6 is a diagram illustrating an example of DL HARQ process when TDD-FDD is configured. The PCell in FIG. 6 shows the case of TDD UL/DL configuration 5 and the SCell is FDD-configured.

As shown in FIG. 6, when TDD-FDD CA is configured, the maximum process number for FDD serving cell may increase from 8 to 17. In such case, the size of the HARQ process number field in the DL DCI format for PDSCH transmitted on the FDD serving cell may be 5 bits.

Or, also in case of applying reference UL/DL configuration for DL HARQ timing to FDD serving cell, there may be maximum 15 HARQ process number, and to support them the size of the HARQ process number field may be 4 bits.

Therefore, exemplary embodiments provide that the HARQ process number field size being configured larger than 3 bits under following condition.

For one example (alt 1), when TDD (any TDD UL/DL configuration)-FDD CA is configured, the HARQ process number field in the DL DCI format to order PDSCH transmission on the FDD SCell is always 5 bits.

For another example (alt 2), when TDD(TDD UL/DL configuration 5)-FDD CA is configured, the HARQ process number field in DL DCI format to order PDSCH transmission on the FDD SCell is configured as 5 bits, and in case TDD(TDD UL/DL configuration 0, 1, 2, 3, 4 or 6)-FDD CA is configured, the HARQ process number field in DL DCI format to order PDSCH transmission on the FDD SCell is configured as 4 bits.

For another example (alt 3), in case TDD(any TDD UL/DL configuration)-FDD CA is configured, the HARQ process number field in DL DCI format to order PDSCH transmission on the FDD SCell is always configured as 4 bits.

DAI Field

In current standard, the DAI field in DL DCI format is present only for the TDD operation. In other words, DAI field is not included in DL DCI format to order PDSCH transmitted on FDD serving cell. However, as described above, when considering DL HARQ timing applicable for UE configured with TDD(PCell)-FDD(SCell) CA, DAI field is necessary for FDD SCell in some cases.

For example, as explained in FIG. 5 above, multiple number of subframes on FDD SCell may be associated with one UL subframe on TDD PCell, and thus it is necessary to include DAI field in DL DCI format.

Therefore, exemplary embodiments provide adding DAI field in DL DCI format (by PDCCH/EPDCCH) for PDSCH transmission on FDD serving cell.

For example (alt 1), when TDD(any TDD UL/DL configuration)-FDD CA is configured, the DAI field in DL DCI format to order PDSCH transmission on FDD serving cell is always configured as 2 bits.

DL Index Field

TDD(PCell)-FDD(SCell) CA and cross-carrier scheduling is configured, and TDD serving cell is configured as scheduling cell, and may order the PDSCH transmission on FDD serving cell, which is a scheduled cell. In this case cross subframe scheduling may be introduced. Through a cross subframe scheduling, a base station may transmit DL DCI format (by PDCCH/EPDCCH) indicating PDSCH through a scheduling serving cell in a subframe different from a subframe in which PDSCH of scheduled serving cell is transmitted.

FIG. 7 is a diagram illustrating an example of cross subframe scheduling in case of TDD-FDD CA configuration. FIG. 7 shows a case PCell is configured as TDD UL/DL configuration 1 and SCell configured as FDD. It is assumed that TDD PCell is scheduling cell, and FDD SCell is scheduled cell.

In FIG. 7, PDSCH on subframe 2 and subframe 3 may be ordered through DL DCI format on subframe 1 of TDD PCell. Also, PDSCH on subframe 7 and 8 may be ordered through DL DCI format on subframe 6 of TDD PCell.

For such cross subframe scheduling, it is necessary to use new "DL index field" in DL DCI carried by PDCCH/EPDCCH ordering PDSCH transmission on FDD serving cell, which is a scheduled cell. This DL index field indicates on which subframe the PDSCH ordered by DL DCI is located. In other words, the DL index field may indicate which subframe located after the subframe for transmitting DL DCI format is for the PDSCH to receive order from the DL DCI format.

Therefore, exemplary embodiments provide a method of adding DL index field in DL DCI format (by PDCCH/EPDCCH) which is to support PDSCH transmission on FDD serving cell.

For example (alt 1), in case TDD(any TDD UL/DL configuration)-FDD CA and cross-carrier scheduling are configured, the DL DCI format of the scheduling serving cell to order PDSCH transmission on FDD scheduled serving cell includes 2-bit DL index field.

For another example (alt 2), in case TDD(any TDD UL/DL configuration)-FDD CA and cross-carrier scheduling are configured, the DL DCI format of the scheduling serving cell to order PDSCH transmission on FDD scheduled serving cell includes 3-bit DL index field.

For another example (alt 3), in case TDD(any TDD UL/DL configuration)-FDD CA and cross-carrier scheduling are configured, the DL DCI format of the scheduling serving cell to order PDSCH transmission on FDD scheduled serving cell includes DL index field, and the size of the DL index field is either 2 bits or 3 bits depending on the DL subframe the DL DECI format is transmitted to. In other words, when the DL DCI format is transmitted from certain DL subframe, the index field is configured as 3 bits, and when the DL DCI format is transmitted from the rest of DL subframe, the DL index field is configured as 2 bits.

Case 2. TDD(SCell)-FDD(PCell) CA (1) in Case of UL DCI Format (DCI Format 0/4)

UL Index Field

As described above, in the existing DCI format, 2-bit index field was present only in case the relevant serving cell (or carrier) was configured as TDD UL/DL 0. However, when a UE is configured with cross-carrier scheduling, following UL HARQ/scheduling timing may be applied for the TDD SCell.

FIG. 8 is an illustration of another example of UL HARQ/scheduling timing when TDD-FDD CA and cross-carrier scheduling are configured. FIG. 8 is a case PCell is configured with FDD and SCell is configured with TDD UL/DL 0. The PCell is supposed to be a scheduling cell, and SCell is a scheduled cell.

In FIG. 8 case, the SCell has subframes 0 and 5 configured as DL subframe, and subframes 1 and 6 configured as special subframe. G/H for SCell may be transmitted from base station to EU through subframes 0, 3, 4, 5, 8 and 9 of the PCell. In such case the PCell's subframes 0, 3, 4, 5, 8 and 9 each suggests one PUSCH transmission timing that are different from each other.

This means there is no need for UL index field in the relevant UL DCI format. Therefore, UL index field is not configured in UL DCI format under certain condition.

For an example (alt 1), in case TDD(any TDD UL/DL configuration)-FDD CA and cross-carrier scheduling are configured, UL index field is not present in the UL DCI format on every DL subframe of FDD scheduling serving cell for PUSCH transmission on TDD scheduled serving cell.

DAI Field

As described above, in current standard, DAI field in UL DCI format is present only for the TDD operation of TDD UL/DL configuration 1 or 6. However, when considering DL HARQ timing for TDD SCell that may be applied to TDD(SCell)-FDD(PCell) CA configured UE, DAI field may not be necessary.

FIG. 9 is a diagram illustrating another example of DL HARQ timing when TDD-FDD CA is configured. In FIG. 9, PCell is configured as FDD and SCell is configured as TDD UL/DL 1.

In FIG. 9, G is DL grant, P is PDSCH, and A/N is HARQ ACK/NACK reporting. As in FIG. 9 when serving cell to transmit HARQ response is FDD serving cell, DL HARQ timing for PDSCH transmitted from other aggregated serving cells may follow DL HARQ timing applied to FDD cell. In other words, when the PDSCH transmission for certain UE is detected in subframe n−4, the UE may transmit HARQ response in the subframe n of the PCell.

Thus, in case the UE transmits HARQ-ACK bits responding to PHSCH transmission on UL subframe of FDD PCell, one UL subframe is associated with only one DL subframe.

This means there is no need for DAI field to be present in the relevant UL DCI format. Thus, DAI field is not configured in UL DCI format under certain condition.

For an example (alt 1), in case TDD(any TDD UL/DL configuration, SCell)-FDD(PCell) CA is configured, DAI field is not present in UL DCI format on every DL subframe to order PUSCH transmission on TDD serving cell. The relevant field not being present includes having 0-bit field size. This applies to the description hereafter.

(2) in Case of DL DCI Format (Ex., DCI Format 1/1B/1D/2/2A/2B/2C/2D)

HARQ Process Number Field

As described above, in current standard, DL DCI format may include HARQ process number field, and the field is configured as 3 bits for FDD and 4 bits for TDD. The size of the HARQ process number field may be determined according to the maximum DL HARQ process number.

However, when TDD-FDD CA is configured, FDD DL HARQ timing may be applied to DL HARQ timing on TDD SCell. In this case, maximum DL HARQ process number may be under 8.

Therefore, exemplary embodiments provide a configuration to reduce the HARQ processor field in DL DCI format (by PDCCH/EPDCCH) ordering PDSCH transmission on TDD serving cell to 3 bits.

For an example (alt 1), when TDD(any TDD UL/DL configuration, SCell)-FDD(PCell) CA is configured, HARQ process number field in DL DCI format to order PDSCH transmission on TDD serving cell is always configured as 3 bits.

DAI Field

As described above, in current standard, DAI field in DL DCI format is present only for TDD operation. However, as described above, when considering DL HARQ timing applicable for TDD(SCell)-FDD(PCell) CA configured UE, DAI field for TDD serving cell may not be necessary.

Therefore, DAI field is not configured in DL DCI format to support PDSCH transmission on TDD serving cell, when TDD(SCell)-FDD(PCell) CA is configured.

For an example (alt 1), when TDD(any TDD UL/DL configuration, SCell)-FDD(PCell) CA is configured, DAI field is not present in DL DCI format for PDSCH transmission on TDD serving cell.

Figure 10:
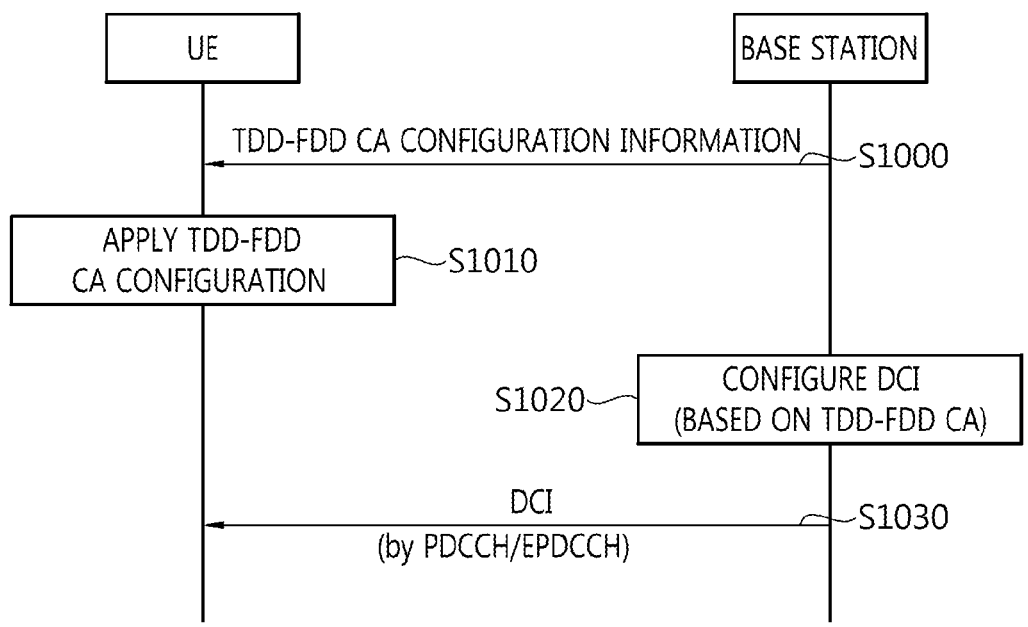
FIG. 10 is a flow diagram illustrating the method of DCI transmission in a wireless communication system supporting TDD-FDD CA according to an exemplary embodiment of the present invention.

FIG. 10 is a flow diagram illustrating the DCI transmission method in a wireless communication system supporting TDD-FDD CA according to exemplary embodiments.

In FIG. 10, base station transmits TDD-FDD CA configuration information to UE (S1000). Base station may transmit the TDD-FDD CA configuration information to UE through RRC signaling. The TDD-FDD CA configuration information includes duplex (ex., FDD/TDD) information for PCell and SCell. Also, base station may transmit more cross-carrier configuration information to UE. Base station may transmit above cross-carrier scheduling configuration information to UE through RRC signaling. TDD-FDD CA configuration information and cross-carrier scheduling configuration information may be transmitted through either same RRC signaling or separate RRC signaling. Above RRC signaling may be RRC connection reconfiguration message.

UE applies TDD-FDD CA configuration (S1010) to itself based on above TDD-FDD CA configuration information. In this case, one of those many TDD-FDD CA configured serving cells may be PCell, and the rest may be SCells. For an example, PCell may be TDD serving cell, and SCell may be FDD serving cell. For another example, PCell may be FDD serving cell, and SCell may be TDD serving cell. When received more of above cross-carrier scheduling configuration information, UE may apply cross-carrier scheduling. For an example, scheduling cell may be TDD serving cell, and scheduled cell may be FDD serving cell. For another example, scheduling cell may be FDD serving cell, and scheduled cell may be TDD serving cell.

Base station configures DCI (S1020). DCI format varies as shown in TABLE 2, and a base station may configure various formats of DCI upon necessity. In such case, the base station configures DCI considering the TDD-FDD CA configuration information. DCI format may be divided into UL DCI format suggested above and DL DCI format.

For an example, UL DAI format of scheduling cell to order PUSCH transmission on FDD serving cell, with TDD serving cell as PCell and FDD serving cell as SCell, may include UL index of 3 bits, 2 bits or 1 bit depending on conditions described above.

For another example, UL DCI format to order PUSCH transmission on FDD serving cell, with TDD serving cell as PCell and FDD serving cell as SCell, may include 2-bit DAI field.

For another example, DL DCI format to order PDSCH transmission on FDD serving cell, with TDD serving cell as PCell and FDD serving cell as SCell, may include 4 bits or 5 bits of HARQ process number field depending on conditions described above.

For another example, DL DCI format to order PDSCH transmission on FDD serving cell, with TDD serving cell as PCell and FDD serving cell as SCell, may include 2-bit DAI field.

For another example, DL DCI format to order PDSCH transmission on FDD serving cell, with TDD serving cell as PCell and FDD serving cell as SCell, may include 3-bit or 2-bit DL index field depending on conditions described above.

For another example, UL DCI format to order PUSCH transmission on TDD serving cell, with FDD serving cell as PCell and TDD serving cell as SCell, may not include UL index field.

For another example, UL DCI format to order PUSCH transmission on TDD serving cell, with FDD serving cell as PCell and TDD serving cell as SCell, may either not include DAI field or include 0-bit size DAI field.

For another example, DL DCI format to order PDSCH transmission on TDD serving cell, with FDD serving cell as PCell and TDD serving cell as SCell, may include 3-bit HARQ process number field.

For another example, DL DCI format to order PDSCH transmission on TDD serving cell, with FDD serving cell as PCell and TDD serving cell as SCell, may not include DAI field or include 0-bit DAI field.

Base station transmits DCI configured as above to UE (S1030). The DCI may be transmitted to UE through PDCCH. Here, PDCCH may include EPDCCH, as described above. UE may acquire DCI by blind decoding PDCCH.

UE may analyze acquired DCI and execute the control operation ordered by the DCI.

FIG. 11 is a bloc diagram illustrating the UE and base station according to an exemplary embodiment of the present invention.

FIG. 11 shows that UE 1100 includes UE communication part, e.g., a transceiver, 1105 and UE processor 1110. A UE may additionally include memory (not shown). Memory is connected to UE processor 1110 and stores various information for the operation of UE processor 1110. The UE processor 1110, in specific, includes RRC processing part, e.g., an RRC processor 1111 and DCI processing part, a DCI processor 1112. One or more processors may be configured to include the RRC processing part 1111, the DCI processing part 1112. In other words, the UE processor 1110 may include one or more processors to process one or more designated processes, such as the RRC process, the DCI process, and the like.

UE communication part 1105 receives PDCCH/EPDCCH from base station 1150. When doing so, the UE communication part 1105 may execute blind decoding. Blind decoding may refer to decoding method that defines certain decoding start point in the given PDCCH/EPDCCH area, decodes all of the DCI format in the given transmission mode, and discerns users by C-RNTI information masked on CRC. The UE communication part 1105 may receive DCI through PDCCH/EPDCCH.

DCI processing part 1112 may analyze acquired DCI and execute the control operation ordered by the DCI. The DCI is characterized to have base station 1150 configured considering TDD-FDD CA according to exemplary embodiments of the present invention. The feature of each format of the DCI is as described above.

Base station 1150 includes base station communication part 1155 and base station processor 1160. Base station 1150 may also include memory (not shown). Memory is connected to base station processor 1160 and stores various information for the operation of base station processor 1160. The operation of base station 1150 in above examples may be implemented by base station processor 1160. The base station processor, in specific, includes RRC processing part 1161 and DCI processing part 1162.

RRC processing part 1161 generates TDD-FDD CA configuration information and transfers the information to base station communication part 1155. RRC processing part 1161 may generate more cross-carrier scheduling configuration information and transfer the information to base station transmission part 1155.

Base station transmission part 1155 transmits TDD-FDD CA configuration information and/or cross-carrier scheduling configuration information to UE 1100 through RRC signaling. In this case the RRC signaling may be RRC connection reconfiguration message.

DCI processing part 1162 configures DCI considering TDD-FDD CA for UE 1100. Base station may configure various formats of DCI upon necessity. The feature of each DCI format is as described above.

Base station communication part 1155 transmits the DCI as configured above to UE 1100. In this case the base station 1155 may transmit the DCI through PDCCH/EPDCCH.

The base station 1150 may establish an RRC connection with the UE 1100 through a first serving cell. The first serving cell is a primary serving cell (PCell), and the base station 1150 may transmit carrier aggregation configuration information through the PCell. The UE 1100 may configure a TDD-FDD CA or an FDD-TDD CA after receiving relevant information from the base station 1150. In the TDD-FDD CA, the PCell may be a TDD cell and at least one FDD cell, which is a secondary serving cell (SCell) may be aggregated to the PCell. In the FDD-TDD CA, the PCell may be an FDD cell and at least one TDD cell, which is an SCell may be aggregated to the PCell. The carrier aggregation configuration information may be included in an RRC message.

When the PCell is a TDD cell and the SCell is an FDD cell, a DL DCI format for indicating a Physical Downlink Shared Channel (PDSCH) transmission on the SCell is configured to include a 4-bit Hybrid Automatic Repeat reQuest (HARQ) process number field and a 2-bit DL downlink assignment index (DAI) field, and a UL DCI format for indicating a Physical Uplink Shared Channel (PUSCH) transmission on the SCell is configured to include a 2-bit UL DAI field. The DL DCI format and the UL DCI format may be transmitted through the SCell. Wherein the 4-bit HARQ process number field indicates an HARQ process number, the 2-bit DL DAI field indicates information associated with scheduling for the PDSCH transmission on the second serving cell, and the 2-bit UL DAI field indicates information associated with the PDSCH transmission within DL subframes corresponding to a UL subframe on the second serving cell.

When the PCell is an FDD cell and the SCell is a TDD cell, a DL DCI format for indicating a Physical Downlink Shared Channel (PDSCH) transmission on the SCell is configured to include a 3-bit Hybrid Automatic Repeat reQuest (HARQ) process number field and a 0-bit DL downlink assignment index (DAI) field, and a UL DCI format for indicating a Physical Uplink Shared Channel (PUSCH) transmission on the SCell is configured to include a 0-bit UL DAI field. The DL DCI format and the UL DCI format may be transmitted through the SCell. Wherein the 0-bit DL DAI field includes that the DL DAI field is not present in the DL DCI format, and the 0-bit UL DAI field includes that the UL DAI field is not present in the UP DCI format.

A cross-carrier scheduling between an FDD cell and a TDD cell may be established. In this case, a PDCCH (or an EPDCCH) including at least one of the DL DCI format and the UL DCI format may be transmitted through the PCell.

According to aspects, an HARQ process number field, a DAI filed in a downlink DCI format, and a DAI field in an uplink DCI format are differently configured for the TDD-FDD CA environment and the FDD-TDD CA environment.

While exemplary embodiments of the present invention have been shown and described in connection with the illustrated embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims.

What is claimed is:

1. A method of transmitting control information from a base station to a user equipment (UE), the method comprising:
    establishing a Radio Resource Control (RRC) connection with the UE through a first serving cell, the first serving cell supporting a Time Division Duplex (TDD) mode;
    transmitting an RRC message to the UE through the first serving cell, the RRC message comprising carrier aggregation (CA) configuration information, the CA configuration information comprising information of a second serving cell supporting a Frequency Division Duplex (FDD) mode, and the first serving cell and the second serving cell being aggregated by a TDD-FDD CA scheme;
    configuring a downlink (DL) downlink control information (DCI) format for indicating a Physical Downlink Shared Channel (PDSCH) transmission on the second serving cell, a 4-bit Hybrid Automatic Repeat reQuest (HARQ) process number field and a 2-bit DL downlink assignment index (DAI) field being configured in the DL DCI format; and
    transmitting, to the UE, at least one of a Physical Downlink Control Channel (PDCCH) and an Enhanced PDCCH (EPDCCH), the at least one of the PDCCH and the EPDCCH comprising the DL DCI format.

2. The method of claim 1, further comprising:
    configuring an uplink (UL) DCI format for indicating a Physical Uplink Shared Channel (PUSCH) transmission on the second serving cell, a 2-bit UL DAI field being configured in the UL DCI format.

3. The method of claim 1, wherein the at least one of the PDCCH and the EPDCCH is transmitted through the second serving cell.

4. The method of claim 1, wherein the first serving cell is a primary serving cell (PCell), and the second serving cell is a secondary serving cell (SCell).

5. The method of claim 1, further comprising:
configuring a cross-carrier scheduling between the first serving cell and the second serving cell, the first serving cell being configured as a scheduling cell, and the second serving cell being configured as a scheduled cell that is scheduled by the scheduling cell,
wherein the at least one of the PDCCH and the EPDCCH is transmitted through the first serving cell.

6. The method of claim 1, wherein the DL DCI format is configured as at least one of DL DCI format 1, DL DCI format 1A, DL DCI format 1B, DL DCI format 1D, DL DCI format 2, DL DCI format 2A, DL DCI format 2B, DL DCI format 2C, and DL DCI format 2D.

7. The method of claim 2, wherein the UL DCI format is configured as at least one of UL DCI format 0, and UL DCI format 4.

8. The method of claim 1, wherein the 4-bit HARQ process number field indicates an HARQ process number, and the 2-bit DL DAI field indicates information associated with scheduling for the PDSCH transmission on the second serving cell.

9. The method of claim 2, wherein the 2-bit UL DAI field indicates information associated with the PDSCH transmission within DL subframes corresponding to a UL subframe on the second serving cell.

10. A method of transmitting control information from a base station to a user equipment (UE), the method comprising:
establishing a Radio Resource Control (RRC) connection with the UE through a first serving cell, the first serving cell supporting a Frequency Division Duplex (FDD) mode;
transmitting an RRC message to the UE through the first serving cell, the RRC message comprising carrier aggregation (CA) configuration information, the CA configuration information comprising information of a second serving cell supporting a Time Division Duplex (TDD) mode, and the first serving cell and the second serving cell being aggregated by an FDD-TDD CA scheme;
configuring a downlink (DL) downlink control information (DCI) format for indicating a Physical Downlink Shared Channel (PDSCH) transmission on the second serving cell, a 3-bit Hybrid Automatic Repeat reQuest (HARQ) process number field being configured in the DL DCI format, wherein a DL downlink assignment index (DAI) field is not configured in the DL DCI format; and
transmitting, to the UE, at least one of a Physical Downlink Control Channel (PDCCH) and an Enhanced PDCCH (EPDCCH), the at least one of the PDCCH and the EPDCCH comprising the DL DCI format.

11. The method of claim 10, further comprising:
configuring an uplink (UL) DCI format for indicating a Physical Uplink Shared Channel (PUSCH) transmission on the second serving cell,
wherein either a 0-bit UL DAI field is configured in the UL DCI format or a UL DAI field is not configured in the UL DCI format.

12. The method of claim 10, wherein the at least one of the PDCCH and the EPDCCH is transmitted through the second serving cell.

13. The method of claim 10, wherein the first serving cell is a primary serving cell (PCell), and the second serving cell is a secondary serving cell (SCell).

14. The method of claim 10, further comprising:
configuring a cross-carrier scheduling between the first serving cell and the second serving cell, the first serving cell being configured as a scheduling cell, and the second serving cell being configured as a scheduled cell that is scheduled by the scheduling cell,
wherein the at least one of the PDCCH and the EPDCCH is transmitted through the first serving cell.

15. The method of claim 10, wherein the DL DCI format is configured as at least one of DL DCI format 1, DL DCI format 1A, DL DCI format 1B, DL DCI format 1D, DL DCI format 2, DL DCI format 2A, DL DCI format 2B, DL DCI format 2C, and DL DCI format 2D.

16. The method of claim 11, wherein the UL DCI format is configured as at least one of UL DCI format 0, and UL DCI format 4.

17. A method of receiving a downlink control information (DCI) by a User Equipment (UE), the UE supporting a carrier aggregation of a Time Division Duplex (TDD) cell and a Frequency Division Duplex (FDD) cell, the method comprising:
establishing a Radio Resource Control (RRC) connection with a base station through a primary serving cell (PCell);
configuring an FDD cell as a secondary serving cell (SCell) when the PCell is a TDD cell or configuring a TDD cell as the SCell when the PCell is an FDD cell;
monitoring a physical downlink control channel (PDCCH) or an Enhanced PDCCH (EPDCCH) to retrieve DCI, the DCI comprising an uplink (UL) DCI format and a downlink (DL) DCI format;
decoding the DCI according to the configuration of the PCell and the SCell;
when a TDD cell is configured as the PCell and an FDD cell is configured as the SCell, retrieving a 2-bit downlink assignment index (DAI) field from the UL DCI format, and retrieving a 4-bit hybrid automatic repeat request (HARQ) process number field from the DL DCI format; and
when an FDD cell is configured as the PCell and a TDD cell is configured as the SCell, retrieving a 3-bit HARQ process number field from the DL DCI format.

18. The method of claim 17, further comprising:
when a TDD cell is configured as the PCell and an FDD cell is configured as the SCell, retrieving a 2-bit downlink assignment index (DAI) field from the DL DCI format,
wherein, when the FDD cell is configured as the PCell and the TDD cell is configured as the SCell, a DAI field is not configured in the DL DCI format or the UL DCI format.

* * * * *